United States Patent [19]
Swaney

[11] 3,812,239
[45] *May 21, 1974

[54] PREPARATION OF SUBMICRON TITANIUM CARBIDE

[75] Inventor: Larry R. Swaney, Wadsworth, Ohio

[73] Assignee: PPG Industries, Inc., Pittsburgh, Pa.

[ * ] Notice: The portion of the term of this patent subsequent to Dec. 23, 1986, has been disclaimed.

[22] Filed: Aug. 24, 1970

[21] Appl. No.: 66,176

Related U.S. Application Data

[63] Continuation-in-part of Ser. No. 860,966, Sept. 25, 1969, which is a continuation-in-part of Ser. No. 762,821, Sept. 26, 1968, Pat. No. 3,485,586.

[52] U.S. Cl................... 423/440, 23/230, 423/659
[51] Int. Cl............................................ C01b 31/30
[58] Field of Search.................... 23/208 A; 423/440

[56] References Cited
UNITED STATES PATENTS 3,340,020   9/1967   Neuenschwander et al.. 23/208 A X
3,275,411   9/1966   Freeman et al................... 23/1 R X
3,253,886   5/1966   Lamprey et al............... 23/208 A X
3,485,586   7/1969   Swaney............................... 23/208

Primary Examiner—M. Weissman
Attorney, Agent, or Firm—Irwin M. Stein

[57] ABSTRACT

Titanium carbide, predominantly in the form of small cubic crystals and having a weight average particle size in the range of from 0.04 to 0.9 micron, is formed by reacting, in the vapor state, titanium halide, reducing agent and carbon source at carbide-forming temperatures. Control and variation of the weight average particle size produced in the above range is accomplished by introducing into the reaction zone from 1 to 100 moles of auxiliary gas per mole of titanium halide reactant.

14 Claims, 3 Drawing Figures

INVENTOR
LARRY R. SWANEY

INVENTOR
LARRY R. SWANEY

ATTORNEYS

PREPARATION OF SUBMICRON TITANIUM CARBIDE

CROSS-REFERENCE TO RELATED APPLICATIONS

This application is a continuation-in-part of my co-pending application for United States Letters Patent, Ser. No. 860,966, filed Sept. 25, 1969, now abandoned, which was a continuation-in-part application of my application, Ser. No. 762,821, filed Sept. 26, 1968, and now U. S. Letters Patent No. 3,485,586.

DESCRIPTION OF THE INVENTION

Titanium carbide can be produced by interreacting, in the vapor phase, a source of carbon, such as methane, a volatile halide of titanium, such as titanium tetrachloride, and a reducing agent, such as aluminum, hydrogen, or combinations thereof, in an enclosed reaction zone at carbide-forming temperatures. See, for example, U. S. Pat. Nos. 2,952,598, 3,205,042, 3,340,020, 3,346,338 and 3,485,586. Average reaction (carbide-forming) temperatures are normally above 1500° C., and usually range from about 1500° C. to about 4000° C. or above. In a convenient method of producing titanium carbide in this manner, hydrogen is passed through a plasma generator, such as a gas arc heater or gas induction heater, or other suitable gas heater with the result that the temperature of the hydrogen is raised to a very high temperature, normally above 1500° C., and usually in the range of 2000° C. to 4000° C. The hydrogen flows outwardly from the heating zone in the form of a luminescent gas stream (plasma) or flame. Vaporous titanium tetrachloride and methane are then injected into the hot hydrogen stream or flame or at least into the environment thereof. The hot hydrogen stream has a heat content sufficient to initiate and maintain the aforesaid reaction.

The aforesaid process is capable of producing submicron titanium carbide of relatively high purity. The specific weight average particle size produced will depend on the design of the equipment used. However, as with many products, one particle size may not suffice for all applications. It is, therefore, desirable to be able to vary the weight average particle size of the titanium carbide product.

It has now been found that the weight average particle size of titanium carbide produced by vapor phase reduction of titanium halide can be controlled and varied by conducting the reaction in the presence of varying quantities of an auxiliary gas. More particularly, it has been discovered that the weight average particle size of submicron titanium carbide can be varied from 0.04 to 0.9 microns, especially from 0.04 to 0.3 microns, by varying the quantity of auxiliary gas introduced into the reaction zone wherein the titanium carbide is formed. This discovery provides a means for regulating and changing the particle size of titanium carbide, within the limits of the equipment used, and lends versatility to the above-described vapor phase process. Thus, the present discovery permits the sequential uninterrupted preparation of more than one titanium carbide particle size in the same equipment.

BRIEF DESCRIPTION OF THE DRAWINGS

Typical equipment that can be used in the practice of this invention is diagrammatically illustrated in the accompanying drawings in which.

DETAILED DESCRIPTION

Figure 1:
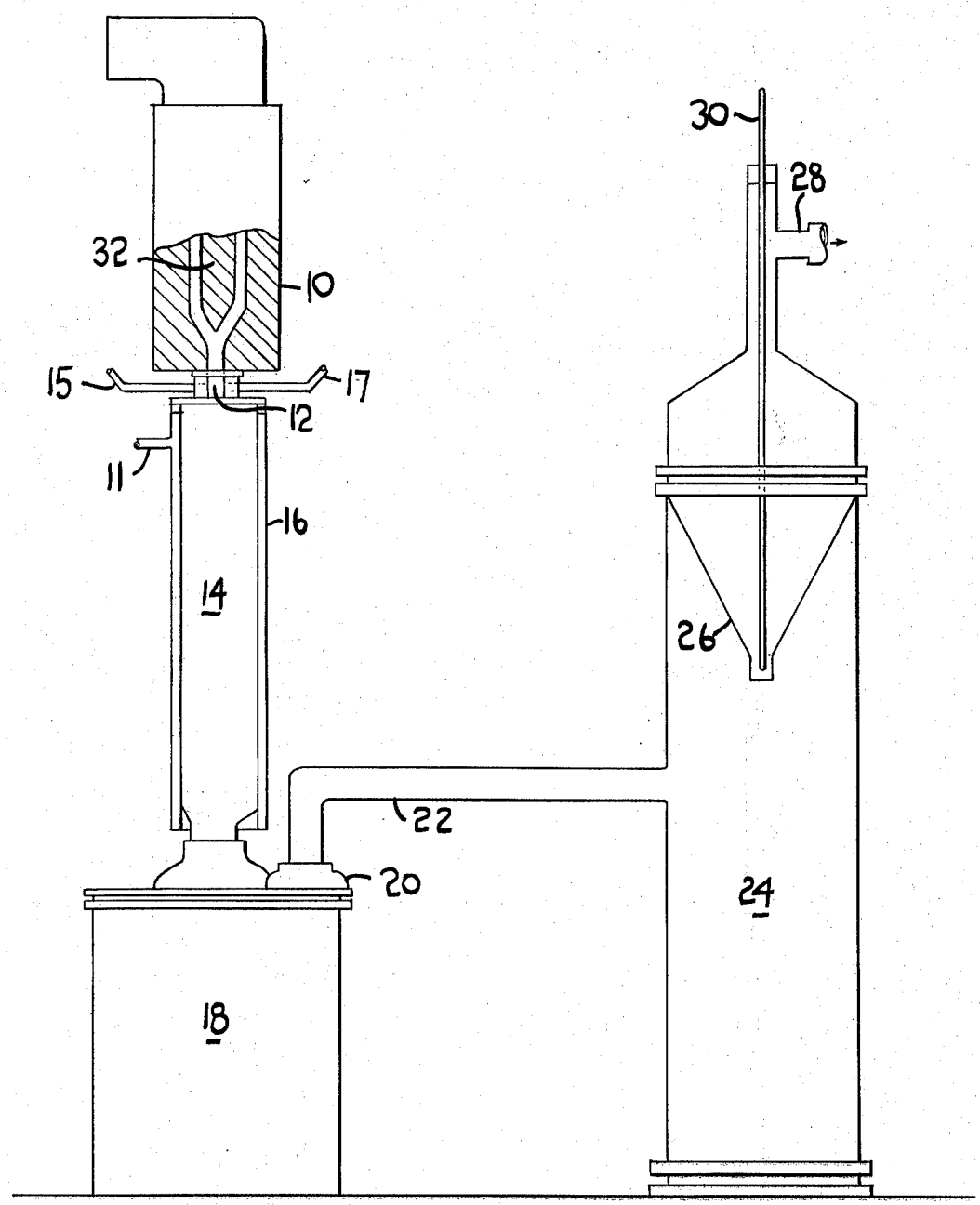
FIG. 1 is a diagram of an assemblage, partially broken away in section, comprising the gas heating system or plasma arc gun, the reactor, and auxiliary equipment for recovering the resulting titanium carbide.

Typical of the titanium halides that can be employed in the present process include: titanium tetrachloride, titanium tetrabromide, titanium tetraiodide, and titanium tetrafluoride, as well as subhalides of titanium, such as titanium dichloride, and titanium trichloride. Of course, subhalides other than the subchlorides and subfluorides can be used in the same manner. Further, mixtures of halides, such as the chlorides and the bromides, can be employed as the titanium halide reactant. As the reducing agent, aluminum, hydrogen or combinations thereof can be used. Typically, hydrogen alone is used.

In the aforesaid process, volatile hydrocarbons, halogenated hydrocarbons, or mixtures of such compounds can be used as the source of carbon. As used herein, the term "halogenated hydrocarbon," e.g., "chlorinated hydrocarbon," is intended to mean and include both compounds of carbon, halogen and hydrogen and compounds of carbon and halogen, e.g., carbon tetrachloride. Typical of hydrocarbons that can be used as the carbon source include the normally gaseous or liquid but relatively volatile hydrocarbons including saturated and unsaturated $C_1 - C_{12}$ hydrocarbons such as methane, ethane propane, the butanes, the pentanes, decanes, dodecanes, ethylene, propylene, the butylenes and amylenes, symmetrical dimethylethylene and like alkenes, cycloaliphatic and aromatic hydrocarbons, such as cyclopentane, cyclohexane, toluene, benzene, etc., acetylenic compounds of which may be noted acetylene, methyl acetylene, ethyl acetylene, and dimethyl acetylene. Methane or propane are economically preferred for this purpose. Rarely are hydrocarbons of more than twelve carbons used.

Examples of halogenated hydrocarbons that can be used as the source of carbon in the process described herein include compounds containing from one to twelve, more usually one to eight, carbon atoms, such as methyl chloride, chloroform, methylene chloride, carbon tetrachloride, dichlorodifluoromethane, amyl chloride, chloroethane, vinyl chloride, 1,1-dichloroethylene, 1,2-dichloroethylene, 1,1-dichloroethane 1,2-dichloroethane, ethylene dibromide, trichloroethylene, perchloroethylene, propylene dichloride, 1,1,2-trichloroethane, 1,1,1-trichloroethane, 1,1,1,2- and 1,1,2,2-tetrachloroethane, hexachloroethane, and like aliphatic chlorides, fluorides, bromides or iodides containing up to about twelve carbon atoms, most preferably up to about six carbon atoms. Aromatic halocarbon compounds, e.g., chlorocarbon compounds, also can be used. Such compounds include $C_6 - C_9$ halogenated aromatic compounds such as monochlorobenzene, orthodichlorobenzene, paradichlorobenzene and the like. Cycloaliphatic halides, such as the $C_5 - C_6$ aliphatic halides, e.g., chlorinated cyclopentadiene, cyclohexylchloride, etc., can also be used.

Typically, the above-described hydrocarbons and halogenated hydrocarbons should be readily vaporizable (volatile) without tar formation since otherwise unnecessary difficulties which are unrelated to the process itself can arise, such as plugging of lines by decomposition and/or polymerization products produced in the course of vaporizing the hydrocarbons.

The amount of reducing agent, e.g., hydrogen, utilized in the above-described process should be at least that amount which is required stoichiometrically to satisfy the theoretical demand of the reaction. Typically, the amount of hydrogen used is in excess of the theoretical amount. When the titanium halide used is titanium tetrachloride, and a chlorinated hydrocarbon is used as the source of carbon, the theoretical amount or demand of hydrogen required can be expressed by the equation,

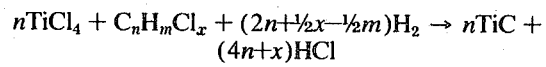

wherein:
   $n$ reflects the number of carbon atoms,
   $m$ reflects the number of hydrogen atoms, and
   $x$ reflects the number of chlorine atoms
in the compound of chlorine and carbon used. Similarly, when other titanium halides are used, the amount of elemental hydrogen used should be in excess of the chemical equivalent of the halogen of the titanium halide. Often, the amount of hydrogen utilized will be in excess of ten times and as high as 100 times the amount of hydrogen shown to be required by the above equation or required to equal the chemical equivalence of halogen of the titanium halide.

The amount of hydrocarbon or halogenated hydrocarbon used as the source of carbon in the above-described process is also used in at least stoichiometric quantities of the amount required by the above equation or required to equal the chemical equivalence of the titanium halide. Usually, at least 5 percent and often as much as 50 to 150 or 300 percent in excess of the amount required by the above equation is used.

Any convenient method for bringing the respective reactants to reaction (carbide-forming) temperatures can be used. Thus, for example, all of the reactants can be heated individually to or above reaction temperature and then admixed in a suitable reaction zone; or, one or more but not all of the reactants can be heated to temperatures in excess of reaction temperature and admixed in the reaction zone with the remaining reactant(s), which have been introduced into the reaction zone at temperatures below reaction temperature. The highly heated reactant(s) bring the remaining reactant(s) to reaction temperature quickly and causes formation of the titanium carbide. Preferably, the latter scheme is used.

The present invention will be more fully understood by reference to the accompanying drawings. Referring now to FIG. 1, there is shown apparatus comprising a plasma gun or torch 10 capable of projecting a downwardly directed flame (not shown). This flame projects into a tube 12 which connects at its lower end with a tube or chamber 14 which is enclosed in gas tight, water cooled jacket 16. The tubular chamber extends downwardly and exits into a settling chamber 18 which has an outlet 20 at the top thereof to convey exit gases to a conduit 22 and thence to a gas separation chamber 25 in which there is disposed a bag filter 26, electrostatic precipitator or other convenient means for separating suspended solids from a gas. The separation chamber 24 also has an exit or exhaust 28 at its upper portion on the opposite side of the bag filter. As shown, the bag filter has engaged therewith a suitable shaking means 30.

The walls of tube 14 can be porous, for example, being composed of porous graphite or other porous inert material through which gas, which is inert to TiC, may be fed in order to suppress or prevent accumulation of the pulverulent TiC powder on the tube walls. Suitable gases for this purpose include the noble gases, such as argon, or other non-reactive gases, such as hydrogen. This gas is introduced through inlet 11 into the jacket 16 and then flows through the tube walls into the interior of tubular chamber 14. In accordance with the present process, auxiliary gas can be fed through the porous wall of tube 14 into the reaction chamber to both control the particle size of the titanium carbide product and suppress accumulation of TiC powder on the tube walls.

Figure 2:
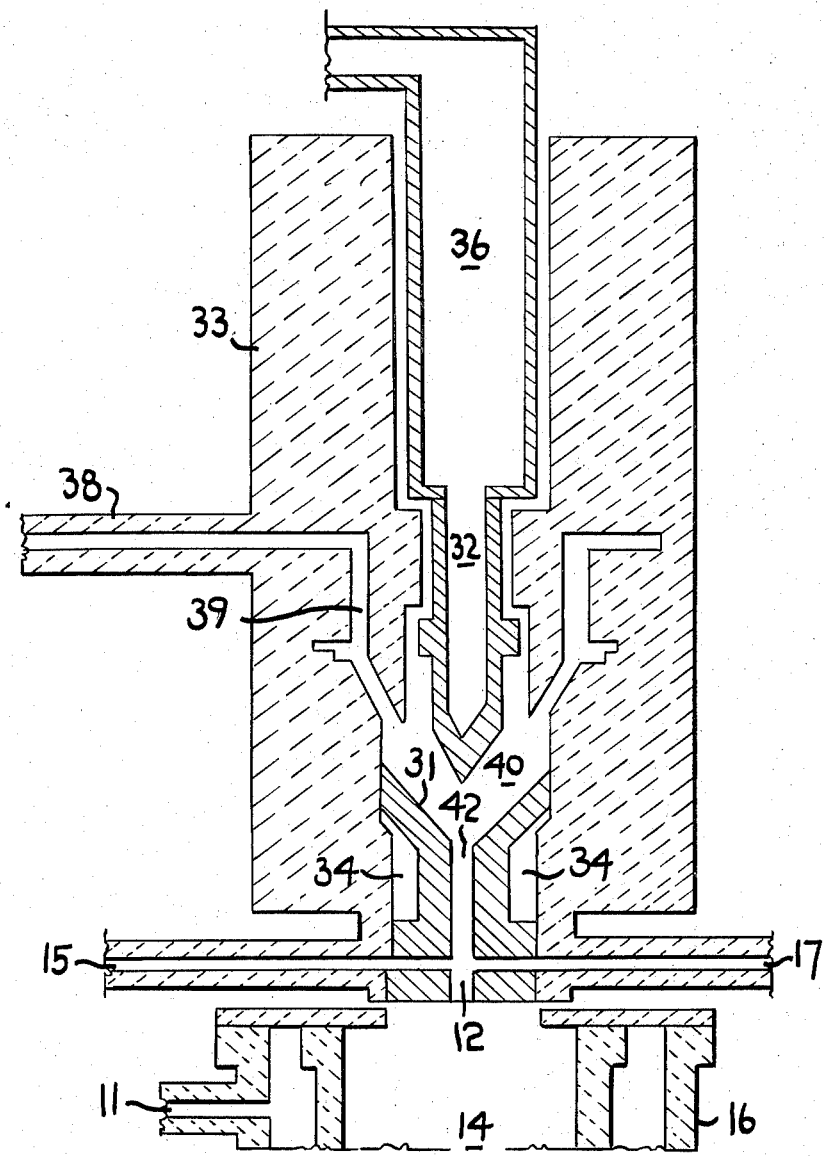
FIG. 2 is a diagrammatic sectional view of a typical plasma arc gun capable of use in the practice of this invention.

As illustrated in FIG. 2, wherein like numbers indicate like parts, the plasma gun consists essentially of an annular anode nozzle 31 which is aligned axially with a cathode rod 32 which is mounted in a cylindrical base 33 which is electrically non-conductive and which encloses the cathode rod and annular anode nozzle. In the embodiment illustrated, the cathode rod tapers conically at its end essentially to a point.

As is conventional with such guns, the anode is enclosed by a cooling chamber 34 through which water or other cooling medium can be circulated by means not shown in order to hold the anode at a suitable low temperature and prevent undue erosion thereof. In a similar manner, the interior of the cathode is provided with a cooling chamber 36 with means (not shown) to circulate water or cooling fluid therein in order to hold the cathode at a suitable temperature. The anode and cathode are spaced longitudinally as indicated in the drawing to provide an annular space 40 which tapers conically to the axial outlet conduit 42 which is axially aligned with outlet tube 12. An electric arc is struck between the cathode and the anode by establishing a proper voltage therebetween. The assemblage is also provided with an arc gas inlet 38 which communicates through an annular, conical conduit 39 with the gas space 40 to supply the arc gas, normally hydrogen, to be heated in or by the arc.

Figure 3:
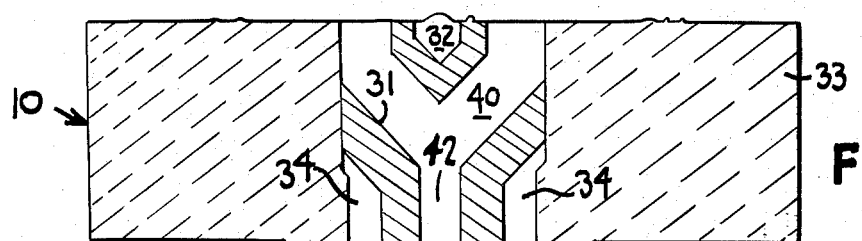
FIG. 3 is a diagrammatic sectional view of the lower portion of the plasma arc gun and the upper portion of the reactor in combination with three-slot reactant mixer means.

In the operation of the device illustrated, the arc gas such as hydrogen or mixtures of hydrogen with one or more of the noble gases such as argon, neon or helium is fed into passage 40 through inlet 38. Cooling medium is circulated through the anode and cathode cooling chambers 34 and 36 to hold the temperature of the electrodes low enough to minimize corrosion or erosion thereof and an electric potential furnished by a suitable power source (not shown) is set up between the anode and cathode to cause the arc to be struck and maintained. Gas flow is continued through inlet tube 38 and, as a consequence of the arc, the gas reaches a high temperature and escapes through conduit 42 in the anode, producing a rapidly flowing, glowing stream or flame of the hot gas. This flame projects downwardly through the central area of tube 12 extending even into chamber 14. Carbon source reactant such as hydrocarbon vapor, halogenated hydrocarbon vapor, mixtures thereof, or the like, and optionally together with hydrogen or like diluent gas, is projected through a slot or port in the tube communicating with supply tube 15, while titanium halide, e.g., titanium tetrachloride and, optionally together with hydrogen or like diluent gas, is projected through another port or slot in tube 17. As shown, tubes 15 and 17 are aligned perpendicular to the downwardly flowing stream of hot arc gas. These tubes each extend through the wall of tube or conduit 12 and are directed radially toward the center area in which the flame of hot gas is caused to flow and terminate in the above-mentioned ports in such wall. As a general rule, these ports are on opposite sides of the tube a distance of 180° to 120° from each other, although they can be otherwise located. For example, the tubes can be longitudinally spaced, and can be separated by an inlet tube through which a sheath gas is introduced as depicted in FIG. 3. If desired, such tubes can be positioned downwardly at an angle of from 1° to 90° from the horizontal position shown so that the gas flow is directed at such angle into or in contact with or parallel to the stream of hot hydrogen gas.

Referring now to FIG. 3 wherein like numerals indicate like parts, there is shown, in cross section, a partial assembly of the lower portion of plasma gun 10, the upper portion of reaction chamber 14 and three slot reactant mixer means 45 disposed therebetween. Mixer means 45 comprises three coaxial, longitudinally spaced annular conduits 53, 55 and 57. Each conduit is connected to gas supply tubes 47, 49 and 51 respectively each of which terminates in said conduits as tangential inlet ports 48, 50 and 52 respectively. The gas supply tubes can be connected to gas storage means (not shown) by additional tubular means. The conduits are so arranged as to form conical reactant introduction zone 60.

Reactant mixer means 45 can be constructed of any suitable material, such as graphite, molybdenum, refractory or any other material which will withstand the heat and corrosive environment present in reactant introduction zone 60.

Reactant gases, titanium halide and carbon source, and auxiliary gas are introduced separately and in any sequence through conduits 53, 55 and 57. Preferably, auxiliary gas is introduced through the middle conduit 55 so as to act as a sheath between the two reactant gases and thereby confine the reaction to chamber 14 by keeping the reactants separated until the reaction chamber is reached. In addition, auxiliary gas can be added with the reactant gases.

The gaseous mixture of reactants is swept into the interior of reactor tube 14 by the aspirating effect of the hot arc gas, resulting in a flame which is downwardly directed and extending a substantial distance, for example, 2-6 inches, into the interior of the tube 14. Typically, the reactants and reaction mixture will be in turbulent flow although laminar flow could be used.

The gas suspension of titanium carbide and hydrogen chloride thus obtained flows downwardly into chamber 18. Both the reactor and the chamber are cooled as the gas suspension passes through chambers 14 and 18 so that the reaction mixture is rapidly quenched to a low temperature at which little or no oxidation or reversion of the reaction can take place. Thus, cooling of the gas of the mixture to below 750° C. takes place usually in less than one second and, in any event, less than 10 seconds after the gas leaves the plasma flame.

The resulting gas suspension, after being cooled in chambers 14 and 18, passes through conduit 22 into a separation chamber where the gases are passed through the bag filter 26. Exit gases are then withdrawn from outlet 28. Periodically, the bag filter is shaken to loosen deposits thereon by movement of the shaker stick 30. The separated titanium carbide settles or falls and is collected in the bottom of chamber 24.

In the present process, hydrogen or mixtures of hydrogen and noble gases are used typically as the arc gas, i.e., the gas heated by the plasma arc (although noble inert gas alone, such as argon, could be used). This is advantageous since it insures the establishment of a reducing atmosphere and serves as a halogen, e.g., chlorine, acceptor, removing the halogen from the titanium halide and any halocarbon compound used as hydrogen halide, e.g., hydrogen chloride. When hydrogen is so used, it is important to use anodes which are capable of withstanding the erosion and/or corrosion of the system. Anodes having an exposed surface predominantly composed of molybdenum, tungsten, or thorium metal, or mixtures thereof, are very effective.

Auxiliary gases employed in the present process can be any gas which is compatible with the chemical reactions occurring within the reaction zone. Typically, such gases will be inert and non-reactive with respect to the reactants and reaction products. Exemplary of auxiliary gases that are contemplated for use in the present process include: hydrogen, chlorine, the noble gases, such as argon, helium and neon, carbon dioxide, carbon monoxide, and mixtures thereof such as hydrogen and argon. Preferably, hydrogen, is used because of the compatibility of such gas with the gaseous environment and the elimination of a further gas separation step to recover the auxiliary gas, such as when a dissimilar auxiliary gas is used. While hydrogen may be considered chemically reactive (non-inert) because it can function as a reducing agent for the titanium halide reactant, it has been found that it is also suitable for use as an auxiliary gas in the present process. The auxiliary gas is introduced into the reaction zone at temperatures below reaction temperatures, usually from 15° C. to 200° C., and preferably at room temperature. It is, therefore, to be distinguished from the arc gas, especially when the auxiliary gas and arc gas are the same, such as is possible in the case of hydrogen. Moreover, if hydrogen is not used as the arc gas, but is used as the auxiliary gas and reducing agent, the amount of auxiliary gas used (in accordance with the hereinafter prescribed amounts) is that quantity over and above that required stoichiometrically by the equation set forth above.

The functions of the arc gas and auxiliary gas are separate and distinct and the auxiliary gas effect (control of particle size) cannot be obtained by simply including the auxiliary gas as part of the preheated arc gas.

The amount of auxiliary gas used in the present process will vary inversely with the weight average particle size of titanium carbide desired. Thus, the smaller the particle size produced, the higher the amount of auxiliary gas required. Conversely, the larger the particle size desired, the lesser the quantity of auxiliary gas required. Stated in another way, the weight average particle size of titanium carbide product is inversely proportional to the amount of auxiliary gas used. More particularly, the weight average particle size of titanium carbide is controlled in the range of from 0.04 to 0.9 micron by utilizing from 1 to 100 moles, preferably from 10 to 50 moles, of auxiliary gas per mole of titanium halide reactant.

The auxiliary gas is introduced into the reactor and thence into the reaction zone in any convenient manner. For example, it can be introduced along with the reactants as a carrier gas; as a shroud or sheath gas interposed between the reactant inlet ports; or as a separate stream. Additionally, the auxiliary gas can be introduced through the porous walls of the reactor, when that particular feature is used. Combinations of the aforesaid methods of introduction can also be used. It should not, however, be introduced as a portion of the arc gas (heated by the plasma generator) because it then functions as the arc gas and not as the auxiliary gas, i.e., the functions of the arc gas and auxiliary gas merge. In a preferred embodiment, at least a portion of the auxiliary gas is introduced into the reactor and reaction zone with the carbon source and/or titanium halide reactants.

For purposes of the present invention, the reaction zone is considered to be the entire volume of reaction tube 14. Most of the titanium carbide formation is believed to take place in a principal reaction zone, which is thought to be within six inches of the top of tube 14 (in the environment of the hot hydrogen flame projecting into the tube); however, because of the typically turbulent nature of the gases within tube 14 and the recirculation of gases caused thereby, a small amount of the reaction (e.g., less than 10 percent) is thought to take place in other portions of the tube. Since the principal reaction zone is located near the top of tube 14, it is preferred to introduce the auxiliary gas near the principal reaction zone in order to achieve efficient particle size control, i.e., the nearer to the principal reaction zone the auxiliary gas is introduced, the less auxiliary gas needed for the same effect on particle size.

The present process is more particularly described in the following examples which are intended as illustrative only since numerous modifications and variations therein will be apparent to those skilled in the art.

In the following examples, volumes of gas are expressed in cubic feet per hour at standard conditions (14.7 pounds pressure and 70° F.) or SCFH. The arc heater used in the following examples was a medium voltage, medium amperage heater having a power input of 26 kilowatts. The heater operated with an efficiency of about 58 percent at an impedence of 1.32 ohms.

EXAMPLE I

RUN A

Hydrogen at a rate of 300 standard cubic feet per hour (SCFH) was introduced into and heated by the medium voltage, medium amperage heater described above. The stream of hot hydrogen was projected through a three-slot reactant mixer means similar to that depicted in FIG. 3. The velocity of the hot hydrogen stream aspirated reactant and auxiliary shroud gases from their respective inlet ports, thereby drawing the reactants into the reaction zone within chamber 14. Titanium tetrachoride in an amount of 20.7 grams per minute, together with 10 SCFH hydrogen, were introduced into the bottom slot of the mixer. 1,1,2-trichloroethane in an amount equal to a 57 percent stoichiometric excess (based on titanium tetrachloride), together with 10 SCFH hydrogen, were introduced into the top slot of the mixer. A sheath of auxiliary hydrogen gas in an amount equal to 45 SCFH was introduced into the middle slot of the mixer. The titanium carbide produced was recovered and found to have a BET surface area of about 17 square meters per gram ($m^2$/gram).

RUN B

The conditions of Run A were repeated except that the amount of hydrogen introduced with the 1,1,2-trichloroethane was increased to 45 SCFH and the amount of excess 1,1,2-trichloroethane was calculated to be about 52 percent. The titanium carbide produced was recovered and had a BET surface area of 24 $m^2$/gram.

EXAMPLE II

RUN A

The apparatus of Example I was employed except that two-slot reactant mixer means was employed in place of the three-slot reactant mixer used in Example I, e.g., reactant mixer means 45 without annular conduit 57. Hydrogen at the rate of 300 SCFH was heated by the plasma generator of Example 1. Titanium tetrachloride at the rate of 25 grams per minute, together with 10 SCFH hydrogen as a carrier gas, was introduced into the hot hydrogen stream through the bottom slot of the two-slot reactant mixer. Propane in an amount equal to a 52 percent stoichiometric excess (based on titanium tetrachloride) together with 45 SCFH hydrogen was introduced into the hot hydrogen stream through the top slot of the reactant mixer. The titanium carbide product produced was recovered and found to have a BET surface area of 15 $m^2$/gram.

RUN B

Run A was repeated except that the titanium tetrachloride feed rate was 26.1 grams per minute and the percent excess propane was calculated to be about 46 percent. The amount of hydrogen introduced with the propane was increased to 75 SCFH hydrogen. The titanium carbide produced in this run was recovered and found to have a BET surface area of 28 $m^2$/gram.

EXAMPLE III

RUN A

Using the apparatus and procedures of Example I, titanium tetrachloride at the rate of 18.7 grams per minute, together with 10 SCFH hydrogen, was introduced into the hot hydrogen stream through the middle slot of the three-slot reactant mixer. 1,1,2-trichloroethane in an amount equal to a 64.5 percent stoichiometric excess (based on titanium tetrachloride), together with 45 SCFH hydrogen, were introduced into the hot hydrogen stream through the top slot of the reactant mixer. Hydrogen at the rate of 10 SCFH was introduced into the hot hydrogen stream through the bottom slot of the reactant mixer. The titanium carbide produced was recovered and found to have a BET surface area of 5.1 $m^2$/gram.

RUN B

Run A was repeated except that the amount of hydrogen introduced along with the titanium tetrachloride was increased to 45 SCFH. The titanium carbide produced was recovered and found to have a BET surface area of 15 m²/gram.

EXAMPLE IV

RUN A

The apparatus and procedures of Example II were repeated with the following exceptions. Titanium tetrachloride at the rate of 18.55 grams per minute, together with 4.7 SCFH hydrogen, were introduced into the hot hydrogen stream through the bottom slot of the two-slot reactant mixer. 1,1,2-trichloroethane in an amount equal to 106 percent stoichiometric excess (based on titanium tetrachloride), together with 45 SCFH hydrogen, were introduced into the hot hydrogen stream through the top slot of the two-slot reactant mixer. The titanium carbide product produced was recovered and found to have a BET surface area of 4.8 m²/gram.

RUN B

Run A was repeated except that the titanium tetrachloride feed rate was 18.8 grams per minute, the percent excess 1,1,2-trichloroethane was 114 percent, and the amount of hydrogen introduced with the titanium tetrachloride was increased to 10 SCFH hydrogen. The titanium carbide produced was found to have a BET surface area of 4.7 m²/gram.

RUN C

Run A was repeated except that the titanium tetrachloride feed rate was 18.4 grams per minute, the percent excess 1,1,2-trichloroethane was 119 percent, and the amount of hydrogen introduced with the titanium tetrachloride stream was increased to 45 SCFH. The titanium carbide product produced was recovered and found to have a BET surface area of 11.0 m²/gram.

EXAMPLE V

RUN A

The apparatus and procedure of Example I were used. Titanium tetrachloride at a rate of 20.7 grams per minute together with 10 SCFH hydrogen were introduced into the hot hydrogen stream through the bottom slot of the three-slot reactant mixer. 1,1,2-trichloroethane in an amount equal to 57 percent stoichiometric excess (based on titanium tetrachloride), together with 10 SCFH hydrogen, was introduced into the hot hydrogen stream through the top slot of the three-slot reactant mixer. 45 SCFH of hydrogen as a shroud gas stream was introduced through the middle slot of the reactant mixer. The titanium carbide produced was recovered and found to have a BET surface area of 17 m²/gram.

RUN B

The conditions of Run A were repeated except that the titanium tetrachloride feed rate was 19.4 grams per minute, the percent excess 1,1,2-trichloroethane was calculated to be 56 percent and the amount of shroud hydrogen introduced through the middle slot of the three-slot reactant mixer was increased to 70 SCFH. The titanium carbide produced was recovered and found to have a BET surface area of 23 m²/gram.

The data of Examples I – V show that the surface area of titanium carbide produced by the above-described process can be adjusted or regulated by controlling the addition of an auxiliary gas (hydrogen) into the reaction zone. Argon and argon-hydrogen mixtures have been used similarly with the same effect. The data further show that the manner in which the auxiliary gas is introduced is not critical — the same effect on surface area being observed whether the auxiliary gas (additional hydrogen) is introduced with the titanium halide reactant, the volatile carbon source (1,1,2-trichloroethane) or as a shroud gas. The slight differences in feed rates for the titanium tetrachloride and carbon source reported in the above comparative examples are within the accuracy of the rotometers used to meter in these reactants. From the experimental data accumulated, such differences do not have a significant effect on the BET surface area of the product.

EXAMPLE VI

The device used was substantially as diagrammatically illustrated in FIGS. 1 and 2 hereof. Spacing between the electrodes in the conical passage 40 was about 1/16 inch, the diameter of axial conduit 42 was ⅛ inch and its length ⅜ inch. The diameter of tube 12 was ⅛ inch and of tube 14 was 1¼ inches.

Hydrogen was bubbled through liquid titanium tetrachloride having a temperature of 55° C. to produce a hydrogen-TiCl₄ stream which was introduced through tube and port 17 into tube 12 at a rate of 2.09 grams of TiCl₄ and 4.3 liters of hydrogen per minute. At the same time a mixture of hydrogen and 1,2-ethylene dichloride at a rate of 4.3 liters of hydrogen and 0.8 grams of ethylene dichloride per minute was fed into tube 12 through conduit and port 15. These two conduits were horizontally directed and radially directed toward the axis of tube 12 and spaced 180° from each other.

Hydrogen was fed at the rate of 20 liters per minute into the plasma gun at inlet 38. The current flow between the electrodes was 80 amperes at 90 volts. The titanium tetrachloride-hydrogen mixture and the hydrogen-ethylene dichloride mixture thus was directed in the tube 12 toward the downwardly directed flame of the plasma gun. The gaseous mixture was quenched to below 300° C. in less than one second. This process was continued for 25 minutes. Yield of TiC was 98.2 percent of theory based on TiCl₄.

The product was a finely divided, fluffy, black crystalline powder having a particle size range of 0.02 – 0.35 micron. The predominant particle size range was 0.04 – 0.25 micron. The mean numerical particle size was about 0.06 micron. The particle size distribution was as follows:

99% of the particles were below 0.2 micron
60% of the particles were larger than 0.04 micron
45% of the particles were larger than 0.05 micron
80% of the particles were larger than 0.03 micron
99% of the particles were larger than 0.02 micron In the above process the tube 14 which was 2 inches in diameter was provided with a liner of porous graphite having an outside diameter of 1⅝ inches, an inside diameter of 1¼ inches, and a length of 7⅛ inches. Hydrogen at room temperature was fed through the liner walls at a rate of 35 liters per minute. This gas was fed tangentially into the annular chamber 50 within jacket 16 enclosing the tube and diffused through the porous graphite.

Control of the particle size can be effected by control of the amount of gas which is allowed to enter the reaction zone and/or the quench zone following the reaction zone. Thus, for example, by increasing the amount of hydrogen fed through the porous wall of reactor tube 14 in FIG. 1 from 35 liters to 45 liters per minute, the particle size falls by about one-half. Upon decreasing the amount to 25 liters per minute, the particle size coarsens within the particle size range herein contemplated. This increase or decrease thus changes operating conditions of the quench zone, such as rate of quench, degree of gas dilution, residence time in quench zone, velocity and turbulence of gas flow, etc.

It is to be understood that in addition to the halogen-carbon compounds mentioned above which consist entirely of carbon and halogen, or carbon, halogen and hydrogen, compounds which contain carbon, halogen and an additional element other than hydrogen may be used in lieu of the halohydrocarbon used in the above examples so long as the additional element does not unduly contaminate or affect the titanium carbide or produce undesirable side reactions. For example, phosgene may be used in lieu of all or part of the 1,1,2-trichloroethane of Example I. However, some contamination of the titanium carbide with oxide, either as titanium oxide or oxycarbide, may result. Likewise, chloral, trichloroacetic acid, orthodichlorophenol and metachloronitrophenol may be substituted for a portion or all of such 1,1,2-trichloroethane to produce titanium carbide.

As a general rule, however, it is preferred to avoid the presence of compounds which contain elements other than halogen, carbon and hydrogen because of the difficulty in obtaining high purity titanium carbide when other atoms are present.

The surface area of submicron titanium carbide is a function of the particle size of the titanium carbide particle, i.e., the smaller the particle, the higher the surface area. The weight average particle size in microns of the titanium carbide particles produced in the above examples can be calculated approximately by the expression:

Particle size wt. avg. = 1.25/BET

Applying the aforesaid expression to Examples I – V, it can be observed that the particle size of the titanium carbide produced varied from about 0.045 (Example II, Run B) to about 0.26 (Example IV, Runs A and B). Titanium carbide particles having a weight average particle size of up to about 0.9 micron can be produced by further reduction in the amount of hydrogen carrier gas and/or shroud gas introduced into the reaction zone.

The TiC which is thus produced by this invention is a black crystalline powder. It will be noted that most of the particles produced were in the range of from 0.04 to 0.26 micron. This is an advantageous particle size range since it is neither too large nor too small. TiC in larger particle size range, e.g., 1 – 4 micron, must be milled for many hours in order to provide a product which may be usefully dispersed in tool faces of cutting tools. The smaller particle size range of the product produced according to the present invention permits a more thorough distribution of the TiC in tool face material, such as molybdenum, cobalt, or nickel, for cutting tools, dies, and the like. Furthermore, the relatively narrow range of these small particle sizes permits more ready use of these materials as effective polishing powders, abrasive polishers, pigments, or on sandpapers.

At the same time, the TiC produced according to this invention is not excessively small. This is important since products which are predominantly lower in particle size than 0.03 micron are so small that they cannot effectively be used in polishing or cutting tools or related operations to gain optimum advantage of the intrinsic hardness of TiC.

The advantageous properties herein sought are attained when the preponderant number of crystals of TiC produced according to this invention have a size of 0.04 to 0.25 micron.

In practice, particle size control can be achieved by periodically observing the size of the product coming from the reactor by conventional analytical techniques such as electron micrographs or surface area measurements and, in response to such analysis, adjusting the operating conditions as described above, such as the supply of auxiliary gas to the reactor, to increase the particle size where the observed sample is found to be too small and to decrease such size when it becomes too large, or to make other compensating adjustments as the size increases or decreases within the desired range.

Although the present process has been described with reference to specific details of certain embodiments thereof, it is not intended that such details should be regarded as limitations upon the scope of the invention except as and to the extent that they are included in the accompanying claims.

I claim:

1. In the process of producing titanium carbide by vapor phase reaction of reactants titanium halide and volatile source of carbon selected from $C_1 - C_{12}$ hydrocarbons, $C_1 - C_{12}$ halogenated hydrocarbons and mixtures of such compounds, the improvement which comprises establishing a stream of hot hydrogen-containing gas in a reaction zone within a reactor, introducing the reactants and from 1 to 100 moles of auxiliary gas per mole of titanium halide reactant into the reaction zone, the temperature of the auxiliary gas introduced into said reaction zone being from 15°–200° C, thereby producing in said reaction zone a suspension of titanium carbide particles, removing the titanium carbide suspension from the reaction zone, analyzing the titanium carbide particles for particle size and increasing or decreasing the amount of auxiliary gas introduced into said reaction zone to decrease or increase respectively the size of said titanium carbide particles to maintain the weight average particle size of said titanium carbide particles within a range of from 0.04 to 0.9 microns.

2. The process of claim 1 wherein said titanium halide is titanium tetrachloride.

3. The process of claim 1 wherein said hot hydrogen-containing gas has a temperature of from about 1500° C. to 4000° C.

4. The process of claim 3 wherein said hot hydrogen-containing gas has been heated by a plasma generator.

5. The process of claim 1 wherein said auxiliary gas is hydrogen.

6. The process of claim 1 wherein said hot hydrogen-containing gas has a heat content sufficient to maintain said vapor phase reaction.

7. The process of claim 1 wherein said titanium halide is titanium tetrachloride and said carbon source is 1,1,2-trichloroethane.

8. The process of claim 1 wherein at least a portion of said auxiliary gas is introduced with the titanium halide reactant.

9. The process of claim 1 wherein said reactants are introduced separately into the stream of hot hydrogen-containing gas.

10. The process of claim 10 wherein said auxiliary gas is introduced as a shroud gas for the reactants.

11. The process of claim 11 wherein said shroud gas is located between the reactants.

12. The process of claim 1 wherein said auxiliary gas is introduced into the reactor in the vicinity of the principal reaction zone.

13. The process of claim 1 wherein from 5 to 50 moles of auxiliary gas are introduced into the reaction zone.

14. In the process of producing titanium carbide by vapor phase reaction of reactants titanium tetrachloride and a volatile source of carbon selected from $C_1 - C_{12}$ hydrocarbons, $C_1 - C_{12}$ halogenated hydrocarbons and mixtures of such compounds, the improvement which comprises establishing a stream of hot hydrogen-containing gas in a reaction zone within a reactor, introducing the reactants and from 1 to 100 moles of auxiliary gas per mole of titanium tetrachloride reactant into the reaction zone, the temperature of the auxiliary gas introduced into said reaction zone being from 15°–200° C, thereby producing in said reaction zone a suspension of titanium carbide particles, removing the titanium carbide suspension from the reaction zone, analyzing the titanium carbide particles for particle size and increasing or decreasing the amount of auxiliary gas introduced into said reaction zone to decrease or increase respectively the size of said titanium carbide particles to maintain the weight average particle size of said titanium carbide particles within a range of from 0.04 to 0.9 microns.

* * * * *

UNITED STATES PATENT OFFICE
CERTIFICATE OF CORRECTION

Patent No. 3,812,239            Dated May 21, 1974

Inventor(s) Larry R. Swaney

It is certified that error appears in the above-identified patent and that said Letters Patent are hereby corrected as shown below:

In the claims:

Column 13, line 13, cancel "10" (second instance) and substitute "9";
    Column 13, line 15, cancel "11" (second instance) and substitute "10".

Signed and sealed this 29th day of October 1974.

(SEAL)
Attest:

McCOY M. GIBSON JR.            C. MARSHALL DANN
Attesting Officer              Commissioner of Patents